United States Patent [19]
Nohira

[11] 3,921,396
[45] Nov. 25, 1975

[54] EXHAUST GAS PURIFICATION SYSTEM

[75] Inventor: Hidetaka Nohira, Susono, Japan

[73] Assignee: Toyota Jidosha Kogyo Kabushiki Kaisha, Japan

[22] Filed: May 1, 1974

[21] Appl. No.: 466,027

[30] Foreign Application Priority Data
Nov. 20, 1973   Japan............................ 48-129727

[52] U.S. Cl................................. 60/290; 60/306
[51] Int. Cl.² ........................................ F02B 75/10
[58] Field of Search....................... 60/289, 290, 306

[56] References Cited
UNITED STATES PATENTS

| | | | |
|---|---|---|---|
| 3,733,829 | 5/1973 | Henault | 60/289 |
| 3,805,522 | 4/1974 | Sheppard | 60/290 |
| 3,826,089 | 7/1974 | Nakajima | 60/290 |
| 3,849,984 | 11/1974 | Toda | 60/290 |

*Primary Examiner*—Douglas Hart
*Attorney, Agent, or Firm*—Stevens, Davis, Miller & Mosher

[57] ABSTRACT

A secondary air supply control system for internal combustion engine exhaust gas purification systems which comprises a first change-over valve for selectively supplying secondary air from the air pump either to the upstream side of the catalytic converter or to a second change-over valve, an on-off valve and control valve for controlling the switching of the first change-over valve, a second change-over valve for supplying the secondary air from the first change-over valve to the exhaust ports of the engine for discharging into the atmosphere, and a second control valve for controlling the switching action of the second change-over valve, part of the secondary air from the air pump being supplied to the downstream side of the catalytic converter.

2 Claims, 5 Drawing Figures

EXHAUST GAS PURIFICATION SYSTEM

BACKGROUND OF THE INVENTION

This invention relates to exhaust gas purification systems for internal combustion engines and, more particularly, to a secondary air supply control system for internal combustion engines where secondary air is supplied to the exhaust system for combusting the non-combusted component and other harmful components in the exhaust gas.

Heretofore, there have been practiced a number of methods constructing the secondary air supply control circuit for injecting secondary air into the exhaust system of the engine. However, there are still problems that must be solved to provide for improvements in the light of the advancement of the recent exhaust gas purifying techniques and also in connection with the control of secondary air in case where a catalytic converter is provided in the exhaust system. Taking, for instance, a vehicle having an exhaust system provided with a catalytic converter, the better the oxidizing property of the catalyst the more it is likely to be rendered into over-heated state depending upon the engine operating conditions. By way of example, under such conditions as when driving up a steep slope or at the time of high speed driving, where the engine throttle aperture is large and the quantity of non-combusted component of the exhaust gas to be treated in the exhaust system is very large, the catalyst is liable to be heated to a high temperature due to its own reaction heat, eventually deteriorating its thermal properties.

Also, in case of running down a long steep slope continuously, very little air-fuel mixture is supplied to the combustion chamber due to very small engine throttle valve aperture. In such case, the combustion of fuel in the combustion chamber is insufficient, resulting in a great quantity of non-combusted component in the exhaust gas exhausted into atmosphere.

Further, in case of ignition failure in one or more cylinders in a multi-cylinder internal combustion engine due to failure of the ignition system or other causes the exhaust gas exhausted from that cylinder or cylinders is the supplied air-fuel mixture itself.

In such special situations the exhaust gas contains a non-combusted component and air, so that it can be sufficiently re-combusted by the action of the catalyst. In this case, however, the catalyst is often prone to over-heating due to the combustion, promoting the deterioration of the catalyst and eventually leading to the loss of thermal safety of the vehicle.

Still further, in the case when the supply of secondary air to the catalytic converter is cut, the sulfur component contained in the fuel or lubricating oil is often absorbed to the catalyst and converted through catalytic reactions into hydrogen sulfide, which is very harmful when it is discharged into atmosphere.

To evade the deterioration of the catalyst due to its over-heating, it has been a usual practice to cut the supply of the secondary air. However, the engine operating condition changes instantaneously, and there is proposed no system for supplying secondary air to the exhaust gas in accordance with the instantaneously changing engine operating condition.

SUMMARY OF THE INVENTION

An object of the invention is to permit combustion of non-combusted component in the exhaust gas while preventing the deterioration of the catalytic converter due to heat of combustion and generation of a harmful odor by detecting the engine operating conditions and selectively supplying secondary air to a proper position of the exhaust system according to the detected engine operating conditions. According to the invention, the air pump for supplying the secondary air is connected through two change-over valves to exhaust ports of the engine and an exhaust duct at a position thereof on the upstream or downstream of the catalytic converter, with the two change-over valves being switched in accordance with the negative pressure in the intake system, temperature of the catalytic converter, whether the engine is being warmed up, and other factors.

DESCRIPTION OF THE PREFERRED EMBODIMENT

Figure 1:
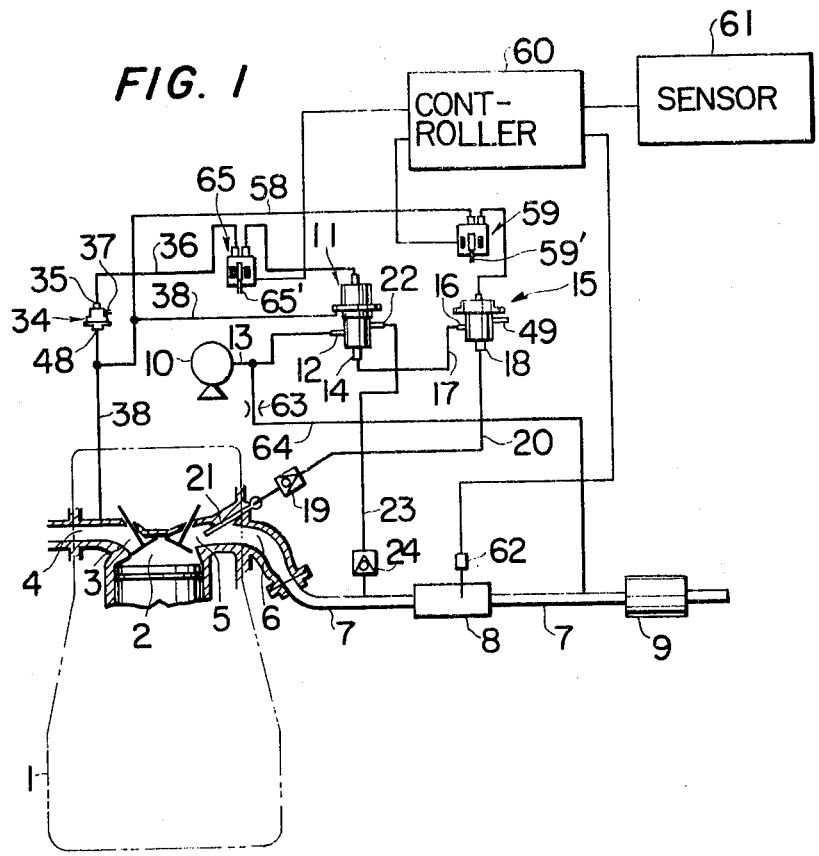
FIG. 1 is a schematic representation of a secondary air supply control system for internal combustion engines according to the invention.
Figure 2:
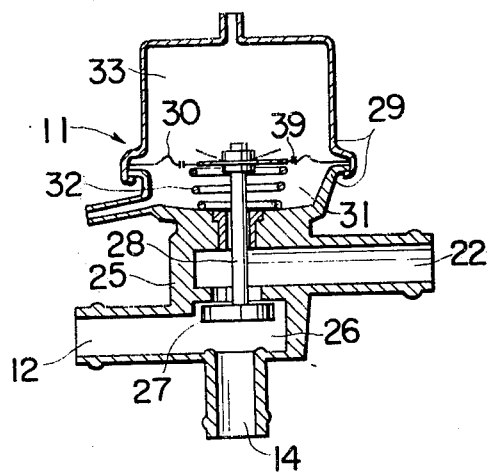
FIGS. 2 and 3 are sectional views showing respective two-position change-over valves used for the secondary air supply control system.
Figure 3:
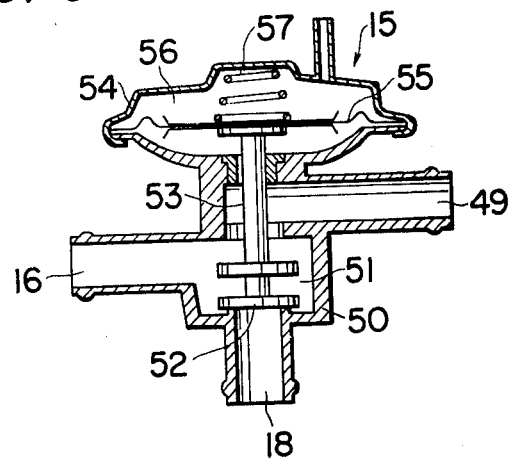
Figure 4:
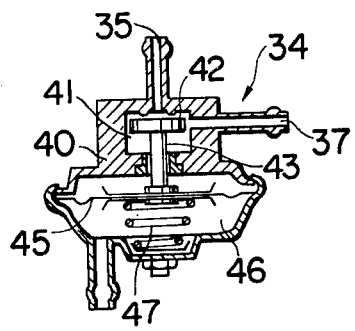
FIG. 4 is a sectional view of an on-off valve used for the secondary air supply control system.

Referring to FIGS. 1 to 4, reference numeral 1 designates an engine body, and numeral 2 a combustion chamber provided with an intake port 3 connected to an intake manifold 4 and an exhaust port 5 connected to an exhaust tube 6. The exhaust tube 6 is connected to an exhaust duct 7 for leading the exhaust gas to the atmosphere. The exhaust duct 7 is provided with a catalytic converter 8 and a muffler 9 downstream thereof. An air pump 10 for supplying secondary air to the exhaust system is connected through a duct 13 to the inlet port 12 of a two-position change-over valve 11. Branching from the duct 13 is a duct 64 having an orifice 63 and connected to the exhaust duct 7 on the downstream side of the catalytic converter 8. Part of the secondary air may thus be supplied through the duct 64 to the exhaust duct 7 for combusting the sulfur component in the exhaust gas. If it is found necessary, a non-return valve may be provided on the duct 64 at an intermediate position thereof to prevent the reverse flow of the exhaust gas in the duct 13. An outlet port 14 of the two-position change-over valve 11 is connected through a duct 17 to an inlet port 16 of a separately provided two-position change-over valve 15. An outlet port 18 of the two-position change-over valve 15 is connected through a duct 20 having a non-return valve 19 to a nozzle 21 open to the exhaust port. In the catalytic converter 8, secondary air supplied from the nozzle 21 to the exhaust port 5 and the non-combusted component in the exhaust gas are reacted to combust the non-combusted component. The non-return valve 19 serves to cause the flow of secondary air only into the exhaust port 5. The other outlet port 22 of the two-position change-over valve 11 is connected through duct 23 to the exhaust duct 7 on the upstream side of the catalytic converter 8. The duct 23 is provided with a non-return valve 24 for causing the flow of secondary air only into the exhaust duct 7. The two-position change-over valve 11 has a housing 25 provided with a valve chamber 26 formed between inlet port 12 and outlet ports 14 and 22. Provided in the valve chamber 26 is a valve body 27 for closing either outlet port 14 or outlet port 22. The valve body 27 is provided with a rod 28 penetrating the housing 25 and attached at the other end to a diaphragm 30 provided within a casing 29. In one section 31 within the casing 29 a spring 32 urging the diaphragm 30 is provided such that the valve body 27 closes the outlet port 22 due to the spring force of the spring. The other section 33 within the casing 29 is connected through a duct 36 to one outlet port 35 in a valve 34, and a three-way electromagnetic valve 65 is provided on the duct 36 at an intermediate position thereof. The three-way electromagnetic valve 65 has two ports connected to the duct 36 and a further port 65' communicating with atmosphere, and its switching section is connected to a controller 60 to be described hereinafter. The controller 60 controls the three-way electromagnetic valve 65 such that its two ports, other than the port 65', are connected when the catalytic converter 8 is at normal temperature, and the section 33 of the two-position change-over valve 11 and the port 65' are connected when the temperature of the catalytic converter 8 exceeds 900°C.

The other port 37 of the valve 34 is connected to the atmosphere or an air cleaner not shown. When the pressure in the chamber 33 of the two-position change-over valve 11 becomes atmospheric pressure, the diaphragm 30 is displaced against the spring force of the spring 32, so that the valve 27 closes the outlet port 14. The chamber 31 of the two-position change-over valve 11 is connected through a duct 38 to the intake manifold 4 of the engine body 1. The diaphragm 30 is provided with small holes 39 communicating the sections 31 and 33 of the two-position changeover valve 11. By means of the holes 39, upon introduction of a change of the negative pressure in the intake manifold 4 into the section 31 the diaphragm 30 is momentarily displaced against the spring force of the spring 32. At this time, air flows through the small holes 39 until the negative pressure in the section 31 becomes equal to that in the section 33, thereby returning the diaphragm 30 into the initial position. The valve 34 has a housing 40 provided with a valve chamber 41 formed between ports 35 and 37, and a valve body 42 for closing the port 35 is provided within the valve chamber 41. The valve body 42 is provided with a rod 43 penetrating the housing 40 and tied at the other end to a diaphragm 45 provided in the interior 46 of a casing 44. A spring 47 urging the diaphragm 45 is provided within the casing 44, and the valve body 42 closes the port 35 due to the spring force of the spring 47. The interior 46 of the casing 44 is connected through ducts 38 and 48 connected to the intake manifold 4 of the engine body 1. Therefore, if a strong negative pressure (of about 550 to 600 mm Hg) is built up in the intake manifold 45, the diaphragm 4 is displaced against the spring force of the spring 47, thereby opening the port 35. The two-position change-over valve 15 is provided, in addition to the afore-mentioned outlet port 18, with another outlet port 49 communicating with atmosphere or the downstream side of the catalytic converter 8. The two-position change-over valve 15 has a housing 50 provided with a valve chamber 51 formed between inlet port 16 and outlet ports 18 and 49. The valve body 52 is provided with a rod 53 penetrating the housing 50 and tied at the other end to a diaphragm 55 provided within a casing 54. Within a section defined by the casing 54 and diaphragm 55 is provided a spring 57 urging the diaphragm 55, and the valve body 52 closes the outlet port 18 due to the spring force of the spring 57. The spring force of the spring 57 in the two-position change-over valve 15 is adapted such that the diaphragm 55 is displaced to cause the valve body 52 to close the outlet port 49 when the negative pressure within the section 56 becomes weak, substantially - 50 mm Hg. The section 56 in the casing 54 is connected through duct 58 to the duct 38 communicating with the intake manifold 4 of the engine body 1, and a three-way electromagnetic valve 59 is provided on the duct 58. The three-way electromagnetic valve 59 has two ports connected to the duct 58 and a further port communicating with atmosphere, and its switching section is connected to the controller 60. The controller 60 is further connected to a temperature sensor 62 provided in the catalytic converter 8. When the temperature of the catalytic converter 8 exceeds 700°C, the controller 60 acts to switch the three-way electromagnetic valve 59 so that the section 56 in the two-position change-over valve 15 and the port 59' communicate with each other. When the catalytic converter 8 is at normal temperature, the three-way electromagnetic valve 59 assumes its position to provide communication between the two-position change-over valve 15 and duct 38. Further, a sensor 61 for detecting the warmingup state of the engine or for detecting the vehicle speed may be connected to the controller 60 for controlling the three-way electromagnetic valve 59 or three-way electromagnetic valve 65.

The operation of the secondary air control system of the above construction will now be described for individual engine operation states.

At the time of start of the engine or in the warming-up state of the engine, the negative pressure in the intake manifold is weak, and the port 35 is closed by the spring force of the spring 47. In this state, the section 33 of the two-position change-over valve 11 is not communicated with atmosphere through duct 36, three-way electromagnetic valve 65, duct 36 and valve 34. Thus, even if weak negative pressure in the intake manifold 4 is supplied to the chamber 31 of the two-position change-over valve 11, the outlet port 22 is closed by the valve body 27 due to the spring force of the spring 32, thus providing communication between inlet port 12 and outlet port 14. Also, the negative pressure in the intake manifold 4 is supplied to the section 56 of the two-position change-over valve 15 through three-way electromagnetic valve 59, duct 58 and duct 38, with the diaphragm 55 held displaced against the spring force of the spring 57, thus providing communication between inlet port 16 and outlet port 18. Thus, the majority of the secondary air from the air pump 10 flows through duct 13, two-position change-over valve 11, duct 17, two-position change-over valve 15, duct 20 and nozzle 21 to be supplied to the exhaust port 5 of the engine body 1, so that the non-combusted component in the exhaust gas is combusted through the exhaust manifold 6 and catalytic converter 8. At this time, dense air-fuel mixture is supplied due to the choke effect, so that the catalytic converter 8 is subject to over-heating if this state continues for an excessively long period. When the temperature of the catalytic converter 8 is elevated up to 700°C, the temperature sensor 62 acts to have the controller 60 actuate the three-way electromagnetic valve 59 such as to bring the section 56 of the two-position change-over valve 59 into communication with the port 59'. When the three-way electromagnetic valve 59 is switched in this way, the negative pressure in the intake manifold 4 is no longer supplied to the section 56 of the two-position change-over valve 15. As a result, the outlet port 18 is closed by the valve body 52 due to the spring force of the spring 57 acting upon the diaphragm 55, thus communicating inlet port 16 with outlet port 49. In the resultant state, the secondary air from the air pump 10 is led through duct 13, two-position change-over valve 11, duct 17 and two-position change-over valve 15 and is discharged through the outlet port 49 into the atmosphere. With this stoppage of supply of secondary air to the exhaust port 5, the over-heating of the catalytic converter 8 can be prevented. In case if choke effect is present in the engine, an electromagnetic valve for discharging secondary air supplied through the duct 20 to atmosphere may be provided and controlled by the controller 60, which is controlled by a sensor 61 for detecting the warming-up state of the engine.

When the full load operation of the engine sets in, the negative pressure in the intake manifold 4 substantially becomes zero, so that the diaphragm 55 of the two-position change-over valve 15 is no longer acted upon by any negative pressure coming through duct 58 and three-way electromagnetic valve 59. As a result, the exhaust port 18 is closed by the valve body 52 due to the spring force of the spring 57, thus communicating inlet port 16 with outlet port 49. At this time, the inlet port 12 and outlet port 14 in the two-position change-over valve 11 remain in communication with each other, so that the secondary air from the air pump 10 is led through duct 13, two-position change-over valve 11, duct 17 and two-position change-over valve 15 and is discharged through the outlet port 49 to the atmosphere or an air cleaner or downstream of the catalytic converter. In nearly full load engine operating conditions where the non-combusted component in the exhaust gas is great, the non-combusted is also combusted in the catalytic converter 8. In this case, the signal from the temperature sensor 62 controls the controller 60 to actuate the three-way electromagnetic valve 59 such as to bring the section 56 of the two-position change-over valve 15 into communication with the port 59'. Thus, the valve body 52 of the two-position change-over valve 15 closes the outlet port 18 to provide communication between inlet port 16 and outlet port 49, whereby the secondary air flowing into the two-position change-over valve 15 is discharged through the outlet port 49 into the atmosphere, thus preventing the over-heating of the catalytic converter 8. When the temperature of the catalytic converter 8 is further increased (up to 900°C), the controller 60 actuates the three-way electromagnetic valve 65 to bring the section 33 of the two-position change-over valve 11 into communication with the port 65'. Even if this state results, the two-position change-over valve 11 is not switched since the valve 34 remains closed.

At the time of sudden deceleration of the engine or at the time of racing, strong negative pressure built up in the intake manifold 4 is supplied to the section 31 of the two-position change-over valve 11. As a result, the diaphragm 30 is momentarily displaced against the spring force of the spring 32 to close the outlet port 14 with the valve body 27 and provide communication between inlet port 12 and outlet port 22. In the resultant state, secondary air from the air pump 10 is supplied through duct 13, two-position change-over valve 11 and duct 23 to the exhaust tube 7. With secondary air supplied to the exhaust tube 7, the temperature of the exhaust gas in the tube 7 is reduced from that in the neighborhood of the exhaust port 5, so that there is no possibility of explosion of the non-combusted component in the exhaust tube 7. After the momentary switching of the two-position change-over valve 11, the negative pressure in the section 33 is increased since the section 31 in the two-position change-over valve 11 is communicated with the section 33 through the small holes 39 formed in the diaphragm 30, so that the pressure in the section 31 is subsequently balanced with that in the section 33. As a result, the diaphragm 30 is restored to the initial position by the spring force of the spring 32, whereupon secondary air from the air pump 10 is supplied through duct 13, two-position change-over valve 11, duct 17, two-position change-over valve 15, duct 20 and nozzle 21 to the exhaust port 5.

Figure 5:
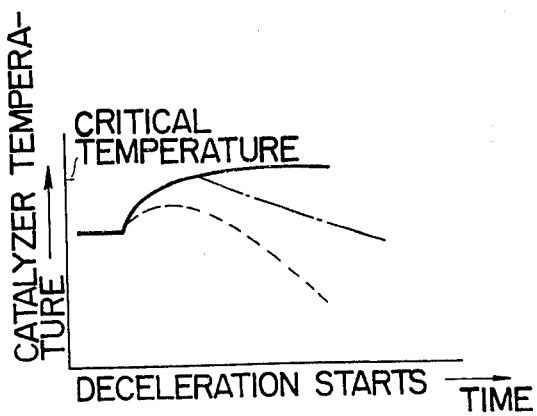
FIG. 5 is a graph showing temperature to which the catalytic converter is required to be cooled.

In case when the vehicle runs down a long inclined road, a strong negative pressure of 550 to 600 mm Hg builds up in the intake manifold 4. With this negative pressure supplied from the intake manifold 4 into the section 46 of the valve 34, the diaphragm 45 is displaced against the spring force of the spring 47, so that the valve body 42 opens the port 35 to bring ports 35 and 37 into communication with each other. In the resultant state, the section 33 of the two-position change-over valve 11 is communicated with atmosphere through duct 36, three-way electromagnetic valve 65, duct 36 and valve 34. In this case, since the negative pressure in the intake manifold 4 is introduced into the section 31 of the two-position change-over valve 11, the pressure balance between the sections 31 and 33 is upset, and the two-position change-over valve 11 is always switched with the negative pressure in the intake manifold 4. In other words, when the section 33 is communicated with atmosphere, the diaphragm 30 is displaced against the spring force of the spring 32, so that the valve body 27 closes the outlet port 14 and communicates the inlet port 12 and outlet port 22. In the resultant state, the secondary air from the air pump 10 is supplied through duct 13, two-position change-over valve 11 and duct 23 to the exhaust tube 7. In this case when the vehicle is running down an inclined road, it might be considered that the temperature of the catalytic converter 8 is increased due to the reaction of the non-combusted component contained in the exhaust gas with air in the catalytic converter 8. Actually, however, the secondary air supplied to the exhaust tube 7 takes away a great quantity of heat, so that the catalytic converter 8 is cooled. As shown in FIG. 5, the temperature, to which the catalyst in the catalytic converter 8 is required to be cooled down, differs considerably depending upon whether secondary air is supplied (as shown by solid curve) or not supplied (as shown by broken curve). The catalytic reaction in the catalytic converter 8 takes place provided the ratio of secondary air to exhaust gas is above a certain value, and with secondary air supplied to the exhaust tube 7 upstream of the catalytic converter 8 the ratio is below the value required for the catalytic reaction to take place.

When an ignition failure results in a cylinder due to some or other trouble in the ignition system of the engine, exhaust gas containing a great quantity of non-combusted component is exhausted, so that the temperature of the catalyst in the catalytic converter 8 is suddenly increased to a value of or above the temperature that results when the vehicle runs down a long inclined road as mentioned earlier. When the temperature of the catalytic converter 8 exceeds 900°C, not only the three-way electromagnetic valve 59 but also the three-way electromagnetic valve 65 is switched to bring the section of the two-position change-over valve 11 into communication with the port 65'. This means that like the case when the vehicle runs down a long inclined road, strong negative pressure built up in the intake manifold 4 is introduced into the section 31 of the two-position change-over valve 11. In the two-position change-over valve 11, the diaphragm 30 is displaced due to pressure difference between the atmosphere pressure in the section 33 and the negative pressure in the section 31, so that the valve body 27 closes the outlet port 14 and communicates the inlet port 12 and outlet port 22. As a result, secondary air from the air pump 10 is introduced through duct 13, two-position change-over valve 11 and duct 23 into the exhaust tube 7 for cooling the catalytic converter 8 to prevent the catalytic reaction of the non-combusted component as mentioned earlier. In this case, the temperature, to which the catalyst of the catalytic converter 8 is required to be cooled down, is low compared to the case when the secondary air is supplied, as shown by the chain curve in FIG. 5.

In any engine operating condition, part of the secondary air from the air pump 10 is supplied through the duct 64 to the downstream side of the catalytic converter 8. In the case when no secondary air is supplied to exhaust port 5 or exhaust tube 7, the exhaust gas contains sulfur content, but this content is combusted with the secondary air supplied to the downstream side of the catalytic converter 8.

As has been shown, according to the invention secondary air is supplied to the exhaust port of the engine when the exhaust gas contains non-combusted component for causing the reaction of the non-combusted component with the secondary air in the catalytic converter. With increase of the temperature of the catalytic converter beyond a certain temperature, however, the supply of secondary air is cut to prevent the reaction of the non-combusted component in the catalytic converter, thereby preventing the deterioration of the catalyst in the catalytic converter. Also, in such circumstances as when suddenly decelerating the vehicle the supply of secondary air to the exhaust port is cut, while momentarily supplying secondary air to the upstream side of the catalytic converter, thereby preventing the explosion of the noncombusted component in the exhaust duct. Further, in such cases as when running down a long inclined road and ignition-failure operation of the engine, secondary air is supplied to the upstream side of the catalytic converter to cool the catalytic converter so as to prevent the deterioration of the catalyst. Furthermore, in the full load operation of the engine, part of the secondary air from the pump is supplied to the downstream side of the catalytic converter, so that no sulfur component will be discharged into the atmosphere.

What is claimed is:

1. In an internal combustion engine having an intake system and an exhaust system with exhaust ports and an exhaust tube having a catalytic converter therein, in which the exhaust gas from the engine body is recombusted in the catalytic converter in the exhaust tube to remove its non-combusted component before it is exhausted into the atmosphere, a secondary air supply control system comprising:
    an air pump for supplying secondary air to the exhaust system,
    a first change-over valve for selectively directing the secondary air from the air pump to the exhaust tube on the up-stream side of the catalytic converter or to a second change-over valve,
    said second change-over valve selectively directing the secondary air from the first change over valve either to or adjacent the exhaust ports of the engine or to the atmosphere,
    a first diaphragm provided in the first change-over valve for switching the first change-over valve according to negative pressure in the intake system of the engine or atmospheric pressure,
    an on-off valve provided in a first duct leading atmospheric pressure to said first diaphragm and switchable on or off according to the negative pressure in said intake system,
    a first control valve in the duct provided between the on-off valve and the first change-over valve for communicating said on-off valve and said first change-over valve or for communicating said duct with the atmosphere according to the temperature of the catalytic converter,
    a second diaphragm provided in the second change-over valve for switching the second change-over valve according to the negative pressure in said intake system, and
    a second control valve provided in a second duct directing the negative pressure from said intake system to the second diaphragm and for communicating the intake system and said second diaphragm or for communicating said second duct with the atmosphere according to the temperature of the catalytic converter, wherein the secondary air for the exhaust system is adapted to be selectively supplied to the upstream side of the catalytic converter and to or adjacent the exhaust ports of the engine.

2. The secondary air supply control system for internal combustion engines according to claim 1, which further comprises:
    a branch tube connected at one end to a duct connecting the air pump and the first change-over valve and at the other end to the exhaust tube on the downstream side of the catalytic converter, whereby secondary air for the exhaust system is always supplied partly to the downstream side of the catalytic converter while it is selectively supplied to the upstream side of the catalytic converter and to or adjacent the exhaust ports of the engine in accordance with the running state of the engine and the temperature of the catalytic converter.

* * * * *